United States Patent
Parsolano

(10) Patent No.: US 10,331,423 B1
(45) Date of Patent: Jun. 25, 2019

(54) UTILIZING CROSS PLATFORM STREAMABLE USER INTERFACES TO REDUCE SOFTWARE DEPLOYMENT FREQUENCY CAUSED BY USER INTERFACE IMPROVEMENTS

(71) Applicant: ZIGISOFT LLC, Boca Raton, FL (US)

(72) Inventor: Frank Parsolano, Boca Raton, FL (US)

( * ) Notice: Subject to any disclaimer, the term of this patent is extended or adjusted under 35 U.S.C. 154(b) by 105 days.

(21) Appl. No.: 15/678,218

(22) Filed: Aug. 16, 2017

Related U.S. Application Data

(63) Continuation of application No. 15/352,834, filed on Nov. 16, 2016, now abandoned.

(51) Int. Cl.
*G06F 9/44* (2018.01)
*G06F 8/38* (2018.01)
*G06F 8/20* (2018.01)
*G06F 9/451* (2018.01)

(52) U.S. Cl.
CPC ............. *G06F 8/38* (2013.01); *G06F 8/20* (2013.01); *G06F 9/451* (2018.02)

(58) Field of Classification Search
CPC .......................................... G06F 9/44
USPC ................................. 717/104–109
See application file for complete search history.

(56) References Cited

U.S. PATENT DOCUMENTS

| | | | |
|---|---|---|---|
| 6,782,413 B1* | 8/2004 | Loveland | H04L 12/4625 379/120 |
| 2003/0197726 A1* | 10/2003 | Weitzman | G06F 8/10 715/744 |
| 2004/0046789 A1* | 3/2004 | Inanoria | G06F 8/38 715/748 |
| 2004/0061713 A1* | 4/2004 | Jennings | G06F 8/38 715/700 |

* cited by examiner

*Primary Examiner* — Jae U Jeon
(74) *Attorney, Agent, or Firm* — Patents on Demand PA; Brian Buchheit

(57) ABSTRACT

One or more characteristic of a user interface (UI) associated with an application source code can be abstracted into a view-controller object that conforms to an environment independent format. The characteristics can be a layout characteristic and a control element characteristic. A placeholder functionality for presenting the user interface can be embedded within an executable created from the source code. The placeholder functionality can lack the characteristic. The executable can be a target native runtime environment specific executable including programming instructions conforming to a programming language of the native runtime environment. The view-controller object can be converted to a language specific user interface object conforming to the programming language. The placeholder functionality can render the user interface using the UI object during runtime of the executable.

12 Claims, 4 Drawing Sheets

… (1)

UTILIZING CROSS PLATFORM STREAMABLE USER INTERFACES TO REDUCE SOFTWARE DEPLOYMENT FREQUENCY CAUSED BY USER INTERFACE IMPROVEMENTS

CROSS-REFERENCE TO RELATED APPLICATIONS

This application claims the benefit of U.S. patent application Ser. No. 15/352,834 filed 16 Nov. 2016, entitled "AUTOMATIC GRAPHICAL USER INTERFACE PROGRAMMING SYSTEM", which is assigned to the assignee of the present application, and the teachings of which are hereby incorporated by reference in their entirety.

BACKGROUND

The present invention relates to the field of user interface design and, more particularly, to utilizing cross platform streamable user interfaces to reduce software deployment frequency caused by user interface improvements.

The importance of mobile applications to businesses have increased dramatically driving the need for aesthetically pleasing and feature rich applications. It is not uncommon for mobile applications to go through many changes during development and/or release. For example, mobile applications are released with a user interface which is continually improved and beautified over the course of the lifetimes of the applications.

As more mobile platforms arise and change, the requirement for application support of multiple different mobile platforms increases. For example, companies rely on providing application access to customers on mobile phones, tablet devices, and desktop computers. Currently, traditional mobile platform application development relies heavily on proprietary frameworks and brute force development of individual applications for each supported platform. That is, the traditional approach requires development of one functionality for an application must be implemented and tested on each platform separately or rely heavily on runtime frameworks which introduces significant application overhead and results in decreased application performance. Consequently, these approaches consumes a significant amount of development time (e.g., framework learning curve) and cost (e.g., framework license cost).

User interfaces are perhaps the most plagued by this divided approach to heterogeneous platform support. To achieve a cohesive solution, user interface designers and developers must work in tandem to deliver a usable product, frequently using many disparate tools (e.g., SKETCH, PAINTCODE, and/or VISUAL STUDIO). Many times user interface design decisions during key developmental cycles can negatively impact developmental progress and vice versa. For example, when a user interface change such as a reordering of screens is performed by the user interface designer, the change can break previously tested screen interoperability application functionality verified by the developer. This problem is further compounded when the application is redesigned multiple times during the development cycle. Each time a user interface design improvement is made, the application must be redeployed. This can frustrate users who are forced to download and/or install the application multiple times to receive the improvements during the development cycle. This extra overhead can impede user usage and damage brand positivity, resulting in lost users and lost income.

BRIEF SUMMARY

One aspect of the present invention can include a method for utilizing cross platform streamable user interfaces to reduce software deployment frequency caused by user interface improvements. One or more characteristic of a user interface (UI) associated with an application source code can be abstracted into a view-controller object that conforms to an environment independent format. The characteristics can be a layout characteristic and a control element characteristic. A placeholder functionality for presenting the user interface can be embedded within an executable created from the source code. The placeholder functionality can lack the characteristic. The executable can be a target native runtime environment specific executable including programming instructions conforming to a programming language of the native runtime environment. The view-controller object can be converted to a language specific user interface object conforming to the programming language. The placeholder functionality can render the user interface using the UI object during runtime of the executable.

Another aspect of the present invention can include a system for utilizing cross platform streamable user interfaces to reduce software deployment frequency caused by user interface improvements. A streaming engine can be configured to create a wrapper library for a user interface of an application source code. The source code can address the user interface via the wrapper library. The engine can be configured to create an executable of a target native runtime environment conforming to a programming language of the runtime environment. The executable can lack sufficient programming instructions to render the user interface during execution. A data store can be configured to persist the wrapper library, the source code, and/or the user interface.

Yet another aspect of the present invention can include a computer program product that includes a computer readable storage medium having embedded computer usable program code. The computer usable program code can be configured to utilize cross platform streamable user interfaces to reduce software deployment frequency caused by user interface improvements. The computer usable program code can be configured to graphically design a user interface (UI) archetype associated with a software development project of an integrated development environment (IDE). The archetype can include a layout and/or a control element of a user interface using at least one data structure and a coding construct of a first programming language. The project can include a source code file conforming to a second programming language and/or a support file. The computer usable program code can be configured to generate an environment independent view-controller object from the archetype. The view-controller object can include project hierarchy information and/or environment independent instructions for drawing the user interface archetype. The computer usable program code can be configured to compile the source code into an executable lacking sufficient drawing instructions to draw the user interface within the target native runtime environment during runtime. The executable can include a reference to the object identifier and one or more references to an instruction identifier. The computer usable program code can be configured to store within a computer readable storage medium the UI object for retrieval during runtime execution of the executable. The computer usable program code can be configured to receive and process the stored UI object during runtime execution of the executable within the target native runtime environment. The computer usable program code can be configured to draw the user interface within the target native runtime environment using the drawing instructions of the UI object, responsive to the processing.

DETAILED DESCRIPTION

Figure 1:
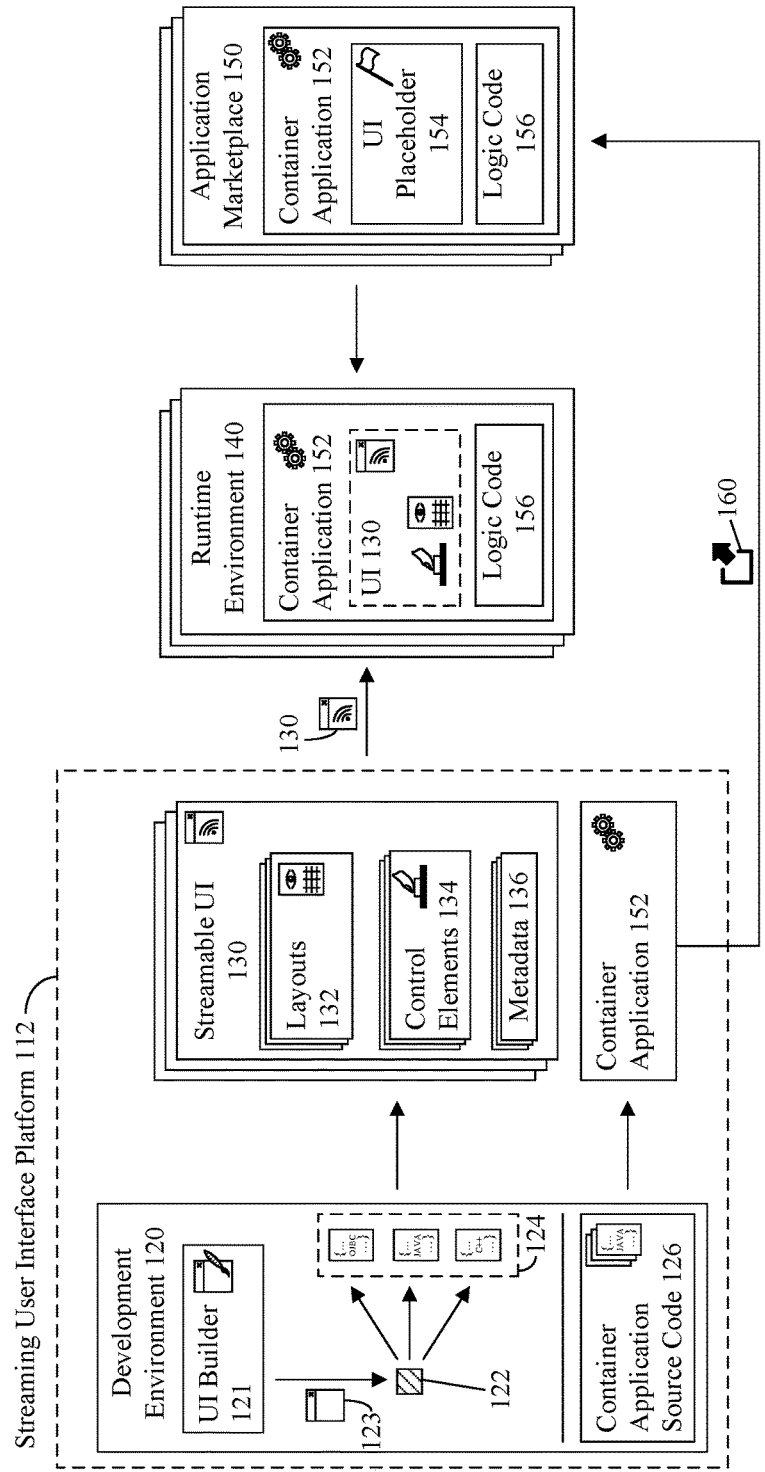
FIG. 1 is a schematic diagram illustrating an embodiment 110 for utilizing cross platform streamable user interfaces to reduce software deployment frequency caused by user interface improvements in accordance with an embodiment of the inventive arrangements disclosed herein.

The present disclosure is a solution for utilizing cross platform streamable user interfaces to reduce software deployment frequency caused by user interface improvements. In the solution, a container application can include a logic code and a user interface placeholder. In one instance, the container application can be deployed within a repository, digital marketplace, and the like which can facilitate retrieval by one or more users. In the instance, the retrieved application can be executed resulting in the user interface placeholder being dynamically replaced in real-time or near real-time by a streamable user interface. In one embodiment, the placeholder user interface can be dynamically and selectively updated by a remotely persisted streamable user interface. In the embodiment, the application can integrate the delta between the streamable user interface and the placeholder interface, which can then be presented. That is, placeholder can be a copy of the stremable user interface which can be easily updated when a change is made to the streamable user interface. For example, when a new input button is added to a streamable user interface, the input button can be dynamically added to the existing (e.g., placeholder) user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating an embodiment 110 for utilizing cross platform streamable user interfaces to reduce software deployment frequency caused by user interface improvements in accordance with an embodiment of the inventive arrangements disclosed herein. Embodiment 110 can be present in the context of embodiments 210, 250, method 300, and/or system 400.

In the embodiment 110, a streaming user interface (UI) platform 112 can permit a streamable UI 130 to dynamically modify a UI placeholder 154 of a container application 152 during application runtime. In one instance, the platform 112 can include development environment 120. In another instance, platform 112 can lack development environment 120. In one embodiment, platform 112 can be associated with a content delivery network and/or platform. In the embodiment, UI 130 can be delivered to target native runtime environment (TNE) 140 utilizing traditional and/or proprietary content delivery mechanism. It should be appreciated that UI 130 can be conveyed similar to traditional content which can be associated with compression, caching, encryption, error-checking, and the like.

In the scenario, application 152 can be deployed 160 to application marketplace 150 utilizing traditional marketplace deployment technologies and/or methodologies. For example, application 152 can be submitted to an application marketplace for approval and when approved can be published to marketplace 150. In one instance, application 152 can include a placeholder UI 154, logic code 156, and the like. In the instance, application can function as a natively executing wrapper able to obtain, process, and/or present streamable UI 130. It should be appreciated that streamable UI 130 can be an "on-demand" software artifact which can be transmitted and/or presented in real-time and/or near real-time.

It should be understood that the disclosure addresses the limitations of traditional software development user interface approaches. In a traditional approach, once an executable is compiled from a source code (which can include drawing instructions for user interface), the layout of the user interface programmed within the source code is static during runtime of the executable. That is, no changes can be made to the layout of the user interface without requiring the recompiling of the source code and associated drawing instructions of the user interface. The disclosure overcomes these limitations by providing a user interface object (e.g., streamable UI 130) for drawing the user interface. The UI object can be addressed using traditional programming techniques (e.g., via object identifier/object reference). Since the object can be a data set (e.g., layout data) and/or classes of drawing instructions, the object can be refreshed during runtime without requiring recompilation.

It should be appreciated that the application 152 can function in an identical manner to a traditional application. That is, the streamable UI functionality is transparent to an end-user, digital marketplace, and the like.

As used herein, a model-view-controller (MVC) can be a software architectural pattern for implementing user interfaces on computers. MVC can divide a given application into three interconnected parts in order to separate internal representations of information from the ways that information is presented to and accepted from the user. MVC design pattern can decouple these major components allowing for efficient code reuse and parallel development. MVC is coupled with a framework which can include libraries that can provide a layer of abstraction on top of the core language. The functionality of the framework is to assist in structuring the code-base and separating the concerns of an application into the three parts: model, view, controller.

The model can be the central component of the pattern. The model can express the application's behavior in terms of the problem domain, independent of the user interface. The model can directly manage the data, logic, and rules of the application. The view can be any output representation of information, such as a chart or a diagram. Multiple views of the same information can be possible, such as a bar chart for management and a tabular view for accountants. The third part, the controller, can accept input and can convert the input to commands for the model or view.

In addition to dividing the application into three kinds of components, the model-view-controller design can define the interactions which can occur between the components. The model can store data that can be retrieved according to commands from the controller and displayed in the view. The view can generate the new output to the user based on changes in the model. The controller can send commands to the model to update the model's state (e.g., editing a document). The controller can also send commands to its associated view to change the view's presentation of the model (e.g., scrolling through a document). It should be understood that the disclosure leverages a decoupled approach to MVC permitting the view and controller to be substantially decoupled from the model of the architecture. In this manner, container application 152 can remain largely unmodified in the presence of major user interface improvements.

As used herein, source code can be any collection of computer instructions, possibly with comments, written using a human-readable programming language, usually as ordinary text. The source code of a program can be specially designed to facilitate the work of computer programmers, who specify the actions to be performed by a computer mostly by writing source code. The source code can often be transformed by an assembler or compiler into binary machine code understood by the computer. The machine code might then be stored for execution at a later time. Alternatively, source code can be interpreted and thus immediately executed. Generated code 124 can be source code which when executed interoperates with a target native runtime environment 140 in absence of a software framework. That is, native code includes native environment 140 specific operations and/or processor specific instructions which can be executed on a specific processor (e.g., x86, ARM) using the instruction set of the processor. For example, code 124 can include commands for drawing a series of text fields, a set of buttons, and text labels associated with a login form of an application 152.

A binary (e.g., container application 152) can be a computer-readable sequence of bytes which permit the execution of computer instructions. Binary files can include headers and/or blocks of metadata used by a computer program to interpret the data in the file. Instructions can include machine code, bytecode, and the like. It should be appreciated that binaries can be platform specific based on the instruction set for which the binary is compiled. In one instance, application 152 can be produced from application source code 126 utilizing a cross-platform non-framework oriented (e.g., native code) approach. In the instance, application 152 can be produced for any digital marketplace 150, runtime environment 140, and the like.

UI 130 can represent a physical arrangement of one or more control elements 134 within a layout 132 (e.g., UI control element hierarchy). UI 130 can include, but is not limited to, control elements 134, media objects (e.g., video/audio), text objects, repeated elements (e.g., header, footer), animations, screen transitions, metadata 136 (e.g., state information), and the like. Layout 132 can include, but is not limited to, a linear layout, a table layout, a list view layout, a grid layout, and the like. Layout 132 can be static (e.g., StaticLayout), dynamic (e.g. Relative, AnchorPane, VBox, HBox), and the like. Layout 132 can generally involve organizational principles of composition to achieve specific communication objectives. Composition can include, but is not limited to, control element arrangement within canvas, control element spacing, control element appearance, control element reactive behavior, fonting (e.g., typeface, size), media arrangement within canvas, media size, media transparency, and the like. It should be appreciated that control element 134 can be associated with one or more UI states, including, but not limited to, hover, onclick, and the like. In one instance, UI 130 can be an object which can be a platform specific data structure which can be utilized by application 152 to render a UI. In the instance, the object can correspond to a runtime environment type, a programming language type, an integrated development environment type, and the like. It should be appreciated that an object can be a variable, a data structure, a function, or a method, and as such, is a location in memory having a value and possibly referenced by an identifier.

As used herein, a graphical user interface design tool 121 can be a software development tool that can simplify the creation of GUIs by allowing the designer to arrange graphical control elements 134 (e.g., widgets) using a drag-and-drop what-you-see-is-what-you-get (WYSIWYG) editor. Control elements 134 can include, but is not limited to, a button, a scrollbar, a checkbox, a radio button, a drop down list, a slider, an input field, a text area, a progress bar, and the like. For example, tool 121 can be a WIMP (Windows, icons, menus, pointers) graphical user interface integrated development environment (IDE).

Development environment 120 can be a computer system in which a computer program or software component can be created, deployed, and/or executed through one or more software tools. In one instance, development environment 120 can include, but is not limited to, UI builder 121, an IDE, marketplace 150 submission tools, software project management tools, error tracking and resolution software, and the like. In one instance, environment 120 can be utilized to compile container application source code 126 into an executable (e.g., binary) container application 152. In the instance, an IDE 120 can be utilized to produce application 152 which can be deployed to marketplace 160.

A cross platform user interface builder 121 can create a user interface archetype 123 within a development environment 120 utilizing one or more software development tools. In one instance, the user interface archetype 123 can be a visual arrangement of one or more control elements based on one or more layouts. In the instance, archetype 123 can be designed utilizing a drag-and-drop what-you-see-is-what-you-get (WYSIWYG) approach. It should be appreciated that user interface code (e.g., controller) can be associated with the user interface (e.g., view). In one embodiment, archetype 123 can be persisted within a data structure 122 including, but not limited to, a JAVA object (e.g., class, serialized object), a Javascript Object Notation (JSON) object, an Extensible Markup Language object, and the like. In one embodiment, structure 122 can be a view-controller object (e.g., VC Object 412) which can include, user interface programming instructions (e.g., layout classes), user interface control instructions, and the like. In the embodiment, structure 122 can encapsulate relevant computer instructions for enabling a streamable UI 130, including, but not limited to, metadata (e.g., for parsing the structure 122), timestamp information, versioning information, and the like.

In one instance, UI builder 121 can utilize data structure 122 to generate native code for a target native runtime environment 140. In the instance, instructions within data structure 122 can be directly translated into runtime 140 specific instructions prior to being conveyed to environment 140. That is, all cross-platform translation is performed for the runtime environment 140 by platform 112 and parsing/presentation of streamable UI can be performed using only functionality of the runtime environment 140. In one embodiment, UI builder 121 can produce adjustable layout programming instructions which can be integrated into application 126 (e.g., UI placeholder 154, streaming UI handler 256). In the embodiment, the adjustable layout programming instructions can be configured during runtime from UI 130 data and/or metadata.

As used herein, streaming can be a sequence of data elements made available over time. Streaming can utilize traditional and/or proprietary mechanism, protocols, and the like. For example, streaming UI can utilize traditional HTTP protocols to transmit one or more control elements 134 to environment 140. In one embodiment, streaming UI can be linked to container application utilizing traditional and/or proprietary mechanisms. Mechanisms can include, but is not limited to, Uniform Resource Identifiers (URI), hashes, and the like. In one instance, one or more logic code 156 bindings for linking control elements 134 to logic code 156 can be present prior to deploy 160. In the instance, bindings can include, but is not limited to, a name binding, UI data binding, and the like.

In one embodiment, application 152 executing in runtime environment 140 can present the streamable UI 130 in real-time or near real-time. In the embodiment, a placeholder 154 UI can be dynamically replaced and/or selectively modified. For example, an additional screen can be dynamically added to the login process of the container application 152 by an application 152 developer after the application 152 has been downloaded from the marketplace 150 and is executing on a mobile phone of a user. In this way, an application 152 developer can make innumerable changes to the UI 130 and dynamically deliver the UI without requiring application 152 to be deployed. Consequently, users are not forced to update the application 152 to have access to an updated version of UI 130.

Application marketplace 150 can be an e-commerce platform for providing digital content, applications, and/or assets. In one instance, marketplace 150 can be a GOOGLE PLAY STORE (e.g., Android), an APPLE iTUNES store (e.g., iOS), a MICROSOFT WINDOWS STORE (e.g., Windows), and the like. Marketplace 150 can persist container application 152 in a traditional manner since the apparent functionality of container application 152 is identical to a conventional platform specific application. It should be appreciate the advantage of the disclosure over traditional application is the reduction in submission and/or approval process frequency for application 152 resulting from UI improvements. It should be understood that subsequent UI improvements can be optionally subjected to a submission/approval process to ensure application 152 and/or UI 130 do not violate marketplace 150 guidelines/rules.

In one instance, UI placeholder 154 can be a framing mechanism for integrating layout instructions, arbitrary control elements (e.g., 134) within container application 152 and/or logic code 156. In the instance, placeholder 154 can include one or more overridable functions, data structures, state information, and the like which can permit control elements 134 to be linked (e.g., coupled) to code 156 during runtime 140. It should be appreciated that the disclosure is not limited to this exact arrangement and can utilize any traditional and/or proprietary coupling mechanism. For example, a rudimentary UI placeholder 154 can be deployed 160 to marketplace 150 to enable application 152 to receive user feedback on UI improvements for the placeholder 154. In the example, the UI improvements can be created from the feedback and delivered immediately to users via streamable UI 130 reducing user satisfaction delay significantly.

It should be appreciated that in one configuration of the disclosure, the application 152 can lack a user interface when deployed the application marketplace 150. That is, application 152 can include bindings (e.g., references) to UI 130 which can be utilized during application 152 runtime to generate a user interface. In another configuration of the disclosure, the application 152 can include a default user interface (e.g., stock interface) which can be selectively ignored during runtime and streamable UI instructions can be used to render the user interface.

Drawings presented herein are for illustrative purposes only and should not be construed to limit the invention in any regard. It should be appreciated that marketplace 150 can be an optional component of embodiment 110. In one instance, streamable UI 130 can be conveyed to limited resource devices to enable dynamic content delivery without modifying the executable of the limited resource device. For example, the disclosure can be leveraged to extend the content delivery ability of Internet of Things (IoT) devices and/or smart devices (e.g., smart TVs) by enabling post deployment UI changes to be affected during runtime.

Figure 2:
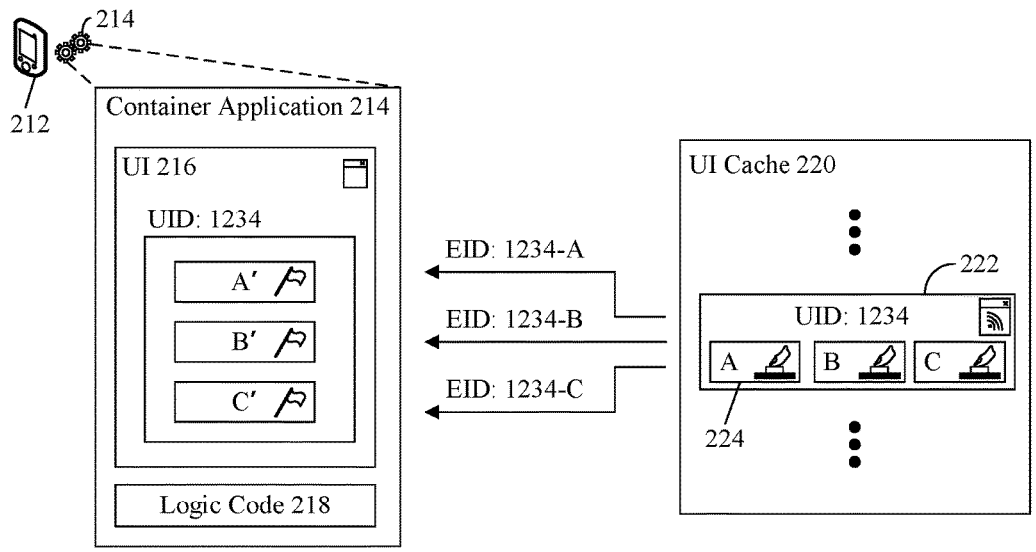
FIG. 2 is a schematic diagram illustrating a set of embodiments 210, 250 for utilizing cross platform streamable user interfaces to reduce software deployment frequency caused by user interface improvements in accordance with an embodiment of the inventive arrangements disclosed herein.
Figure 2:
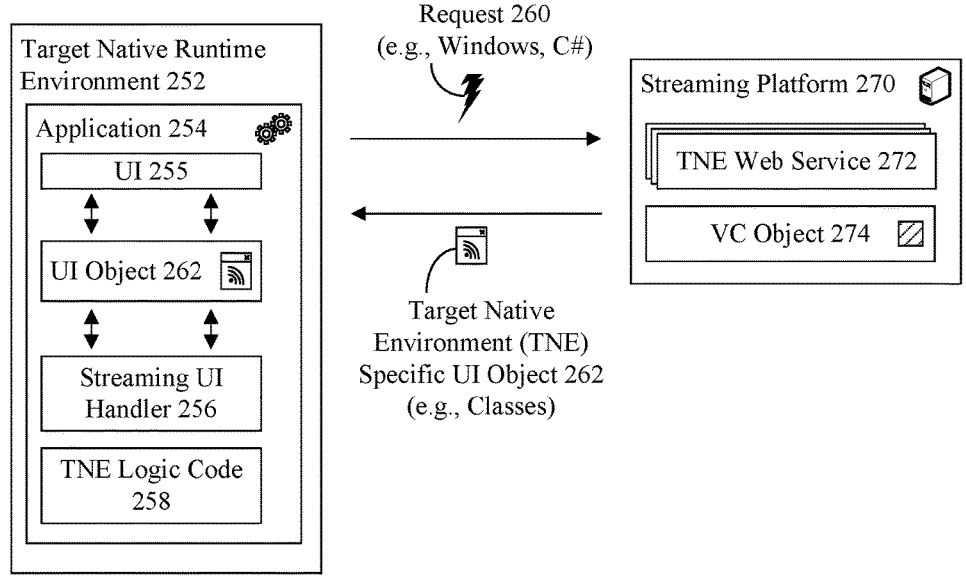

FIG. 2 is a schematic diagram illustrating a set of embodiments 210, 250 for utilizing cross platform streamable user interfaces to reduce software deployment frequency caused by user interface improvements in accordance with an embodiment of the inventive arrangements disclosed herein. Embodiments 210, 250 can be present in the context of embodiment 110, method 300, and/or system 400. Embodiment 210 can illustrate an exemplary name binding for a streamable user interface (UI) within a container application 214. Embodiment 250 can illustrate an exemplary Web-based service architecture for the disclosure.

In embodiment 210, a container application 214 can execute within a runtime environment of a device 212 (e.g., mobile phone). In one instance, one or more components of UI 216 can be dynamically conveyed to container application during runtime from a UI cache 220. In one instance, UI cache 220 can be a component of a streaming platform 112, 270. In the instance, UI cache 220 can persist application specific user interfaces (e.g., 222) and/or application specific control elements (e.g., 224). In one embodiment, UI 216 and/or control elements can each be associated with unique identifiers which can permit direct substitution of elements during runtime. In the embodiment, one or more UI handling functionalities (e.g., handler 256) can perform UI updates when UI improvements have occurred. In one use case, UI 216 can be associated with a unique identifier (UID) 1234. Each component control element of UI 216 can be linked to a different unique identifier A', B', C' corresponding to an element ID (EID) of 1234-A', 1234-B', 1234-C'. UI 222 obtained from cache 220 can include elements 1234-A, 1234-B, 1234-C which can be mapped to 1234-A', 1234-B', 1234-C' resulting in the replacement of 1234-A', 1234-B', 1234-C' with 1234-A, 1234-B, 1234-C. It should be understood that the functionality of embodiment 210 can be included within a larger process (e.g., reconciliation, change management). It should be understood that the functionality of the embodiment 210 can support any arbitrary class of changes and is not limited to the exact substitution mechanism described herein.

In embodiment 250, one or more functionalities of the disclosure can include a Web service 272 within a streaming platform. In the embodiment, a target native runtime environment (TNE) 252 can execute an application 254. Application 254 can include a target native environment logic code 258, a streaming UI handler 256, a UI object 262, and a UI 255. In one instance, UI object 262 can be transmitted in response to a Web based service request 260. In the instance, using request 260 information (e.g., runtime environment, language) TNE Web based service 272 can utilize VC object 274 to generate an appropriate target native environment specific UI object 262. That is, object can be a target native runtime environment independent format representing a UI archetype 123. For example, application 254 can request a UI object 262 from TNE Web based service 272 corresponding to a WINDOWS runtime environment in a C# language utilizing conventional mechanisms (e.g., parameters) of a traditional Web service request.

In the embodiment, the returned UI object 262 can provide one or more data structures (e.g., classes) which can be utilized to query and/or manipulate UI 255. In the embodiment, object 262 can include, methods for accessing UI 255 and/or relevant control elements, references to UI 255 control elements, UI metadata, and the like. In one embodiment, one or more programming language functionalities (e.g., reflection) can be utilized to inspect object 262, invoke object 262 methods, access object 262 members/elements, and the like. In the embodiment, the object 262 can be parsed through a class loader functionality of a programming language. For example, object 262 can be received as a C# serialized object or a compiled C# class which can be deserialized and loaded by a C# class loader. It should be appreciated that since the object is serialized (e.g. on the server), performance of application 254 is unaffected. It should be understood that a compiled class file can conform to any programming language which can be utilized with target native runtime environment.

As used herein, a class can be a set of instructions which can be executed on the target native runtime environment. For example, a class can be a class file which can include JAVA bytecode which can execute within a Java Virtual Machine. The class can include, but is not limited to, class file identifier (e.g., Magic Number), a class file format version, a constant pool, access flags, class name, super class name, interfaces, fields, methods, attributes, and the like.

It should be appreciated that embodiment 250 can support change management functionality which can permit UI changes to be determined during application 254 runtime. In one instance, UI change determination can be performed at application 254 initialization, during post-initialization, and the like. It should be appreciated that a UI change determination can be performed by application 254, platform 270, and the like. In one instance, streaming handler 256 can perform request 260, update checking, and the like. It should be appreciated that handler 256 can be manually generated, automatically generated, and the like.

Drawings presented herein are for illustrative purposes only and should not be construed to limit the invention in any regard. It should be appreciated that, UI object 262 can be requested by application 252 or can be "pushed" to the application 252 responsive to object 274 changes.

Figure 3:
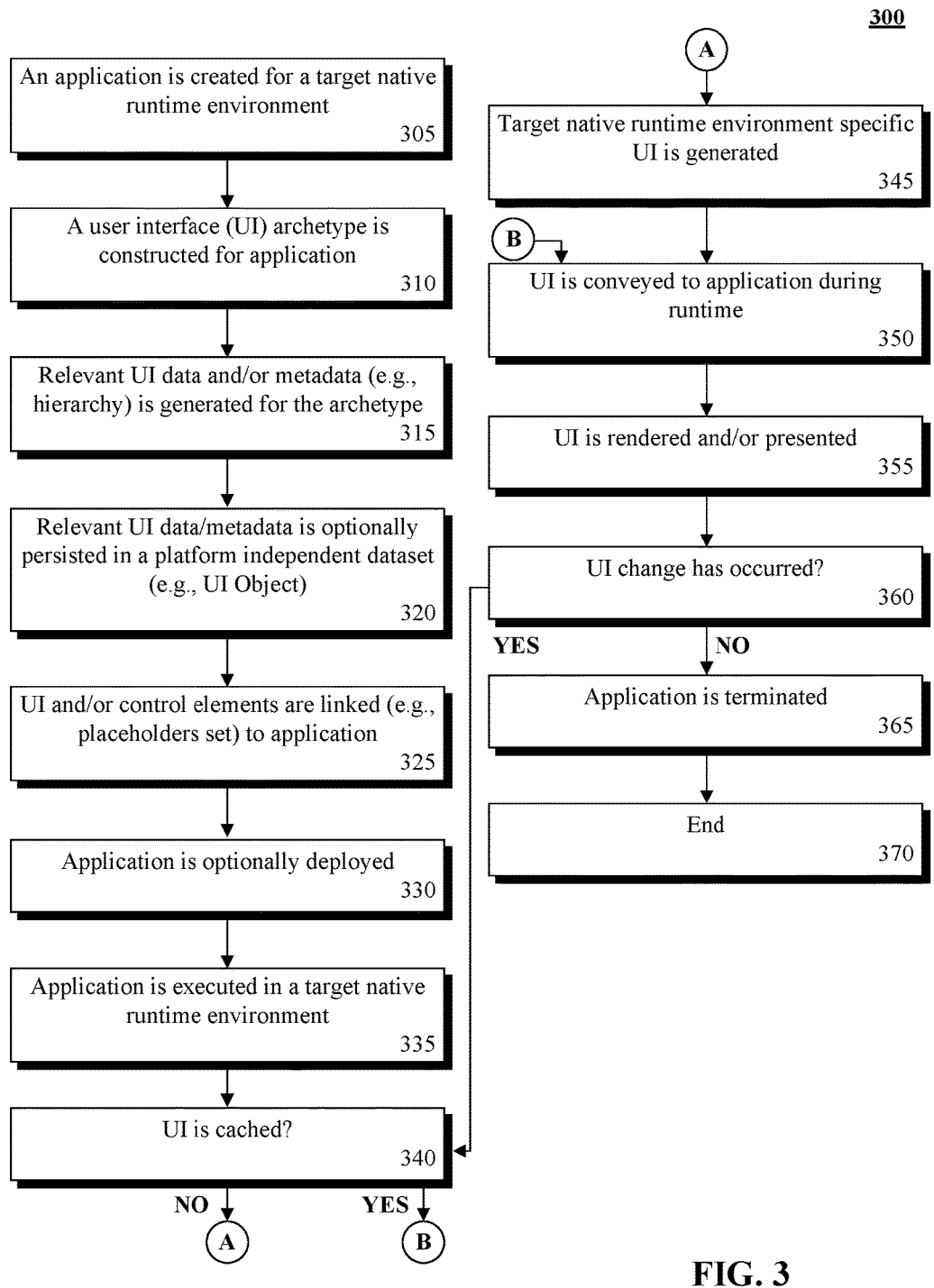
FIG. 3 is a schematic diagram illustrating a method 300 for utilizing cross platform streamable user interfaces to reduce software deployment frequency caused by user interface improvements in accordance with an embodiment of the inventive arrangements disclosed herein.

FIG. 3 is a schematic diagram illustrating a method 300 for utilizing cross platform streamable user interfaces to reduce software deployment frequency caused by user interface improvements in accordance with an embodiment of the inventive arrangements disclosed herein. Method 300 can be present in the context of embodiment 110, 210, 250, and/or system 400.

In method 300, an application can utilize a streamable user interface to update an existing UI during runtime to include UI improvements. In the method, a platform independent UI object of a UI archetype can be persisted within a cloud based environment. The UI object can be conveyed to the application during runtime to enable a "live" update of the UI within the application.

In step 305, a container application can be created for a target native runtime environment. In step 310, a user interface (UI) can be constructed for the application. In step 315, relevant UI data and/or metadata can be generated for the UI. In step 320, the relevant data and/or metadata can be optionally persisted within a platform independent dataset. In step 325, the UI and/or related control elements can be linked to placeholders within the application. In step 330, the container application can be optionally deployed. In step 335, the application can be executed in the target native runtime environment. In step 340, if the UI is cached, the method can continue to step 345, else proceed to step 350. In step 345, the UI can be generated for the target native runtime environment. In step 350, the UI can be conveyed to the application during runtime execution. In step 355, the UI can be rendered and/or presented within a display. In step 360, if a UI change has occurred the method can return to step 340, else proceed to step 365. In step 365, the application can be terminated. In step 370, the method can end.

Drawings presented herein are for illustrative purposes only and should not be construed to limit the invention in any regard. Method 300 can be performed in serial and/or in parallel. It should be appreciated that the method 300 steps 305-370 can be performed in real-time or near real-time. In one instance, method 300 steps 340-360 can be iteratively repeated during method 300 execution.

Figure 4:
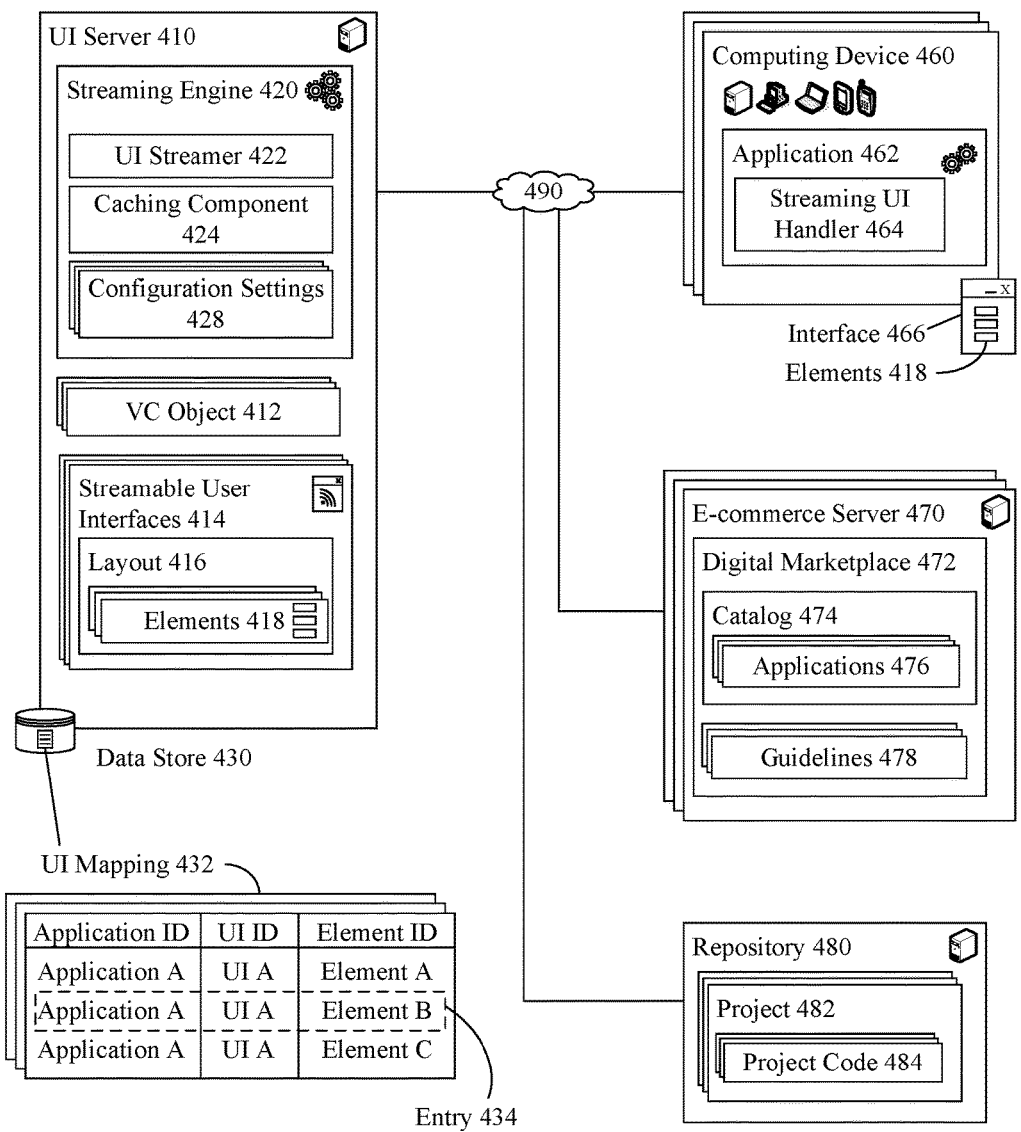
FIG. 4 is a schematic diagram illustrating a system 400 for utilizing cross platform streamable user interfaces to reduce software deployment frequency caused by user interface improvements in accordance with an embodiment of the inventive arrangements disclosed herein.

FIG. 4 is a schematic diagram illustrating a system 400 for utilizing cross platform streamable user interfaces to reduce software deployment frequency caused by user interface improvements in accordance with an embodiment of the inventive arrangements disclosed herein. In system 400, server 410, 470, device 460, repository 480 and/or system 400 components can be communicatively linked via one or more wired and/or wireless networks 490.

In one instance, system 400 can include one or more components of a cloud based computing system. In the instance, system 400 can include AMAZON WEB SERVICES (AWS) functionalities, MICROSOFT AZURE capabilities, IBM CLOUD COMPUTING, and the like. For example, one or more functionalities of engine 420 can be present within a LAMBDA serverless computing service. That is, the disclosure can leverage microservices to enable the functionality described herein.

UI server 410 can be a hardware/software entity for executing streaming engine 420 to enable streamable user interfaces. Server 410 can include, but is not limited to, streaming engine 420, VC object 412, streamable user interfaces 414, data store, and the like. Server 410 functionality can include, but is not limited to, authentication, verification, synchronization, and the like. In one instance, server 410 can include a user interface, messaging/notification capabilities, and the like.

Streaming engine 420 can be a hardware/software element for enabling dynamic UI improvements within application 462. Engine 420 can include, but is not limited to UI streamer 422, caching component 424, configuration setting 428, and the like. Engine 420 functionality can include, but is not limited to, application 462 registration, handler 464 code generation, marketplace deployment capabilities, repository integration, and the like. In one instance, engine 420 can permit integration with integrated development environment (IDE) allowing an IDE to request VC object 412 generation for a specified project of the IDE.

UI streamer 422 can be a hardware/software entity for managing streamable user interfaces 414. Streamer 422 functionality can include, but is not limited to, request handling, VC object 412 conversion, error correction, and the like. In one instance, streamer 422 can generate interfaces 414 from object 412 based on device 460 runtime environment. In one embodiment, streamer 422 can be encapsulated within a Web-based service which can perform real-time or near real-time UI modification.

Caching component 424 can be a hardware/software element for providing real-time or near real-time UI 414 access. Component 424 functionality can include, but is not limited to, cache coherence, prefetching, and the like. In one instance, component 424 can include a Web cache. In one embodiment, component 424 can include an AMAZON ELASTICACHE Web service able to persist interface 414 and/or object 412. It should be appreciated that component 424 can utilize traditional and/or proprietary caching mechanisms to provide UI 414 access during application 462 runtime. In one instance, component 424 can synchronize a local cache associated with application 462 to provide a local copy of UI 414.

Configuration settings 428 can be one or more rules for establishing the behavior of system 400 and/or system 400 components. In one embodiment, settings 428 can include, but is not limited to, VC object 412 creation rules, streamer 422 settings, caching parameters, and the like. In one instance, settings 428 can be manually and/or automatically determined. In the instance, settings 428 can be heuristically determined from historic settings. In one embodiment, settings 428 can be presented within an interface of server 410, interface 466, and the like.

VC object 412 can include project 482 data, project code 484 data, project 484 metadata, repository 480 data, and the like. In one instance, object 412 can include, but is not limited to, unique identifiers of control elements, layout data, and the like. In one embodiment, VC object 412 can be modified through the use of a software development tool (e.g., UI builder 121). In one instance, object 412 can be persisted within data store 430, repository 480, and the like.

In one instance, one or more portions of streamable user interface 414 can be conveyed to application 462 during runtime. In the instance, layout 416 and/or elements 418 can be transmitted piecemeal to enable selective UI updates.

Data store 430 can be a hardware/software component able to persist configuration settings 428, VC object 412, streamable user interfaces 414, mapping 432, and the like. Data store 430 can be a Storage Area Network (SAN), Network Attached Storage (NAS), and the like. Data store 430 can conform to a relational database management system (RDBMS), object oriented database management system (OODBMS), non-relational database management systems, and the like. Data store 430 can be communicatively linked to server 410 in one or more traditional and/or proprietary mechanisms. In one instance, data store 430 can be a component of Structured Query Language (SQL) complaint database.

UI mapping 432 can be a data set for enabling granular control over UI synchronization during runtime. Mapping 432 can include, but is not limited to, application identifier, user interface identifiers, control element identifiers, and the like. In one instance, entry 434 can permit an element B of a user interface A within an application A to be identified allowing streamer 422 to convey the element B when an improvement to B occurs. In one embodiment, mapping 432 can be generated manually and/or automatically. It should be appreciated that mapping 432 is an exemplary data set for enabling the functionality described herein and should not be construed to limit the invention in any regard.

Computing device 460 can be a hardware/software element for permitting the execution of application 462. Device 460 can include, but is not limited to, interface 466, device 460 settings, and the like. Computing device 460 can include, but is not limited to, a desktop computer, a laptop computer, a tablet computing device, a personal digital assistant (PDA), a mobile phone, a set-top box, and the like. In one instance, device 460 can include, but is not limited to, a gaming console, an entertainment device (e.g., smart TV), and the like. In one instance, device 460 can execute application 462 which can present one or more control elements 418. In one embodiment, application 462 can include streaming UI handler 464, application data, and the like. In the embodiment, handler 464 can function as a client side component to enable synchronicity between interface 414 versioning. For example, handler 464 can be utilized to maintain a local cache of interface 414 which can be compared against a remote cache during application startup.

E-commerce server 470 can be a hardware/software entity for presenting digital marketplace 472. Server 470 functionality can include, but is not limited to, application distribution, application 476 submission, application 476 approval, and the like. Server 470 can include, but is not limited to, digital marketplace 472, guidelines 478, and the like. In one instance, digital marketplace 472 can include catalog 474, catalog data, and the like. In the instance, catalog 474 can include application 476, application description, application data, and the like. In one instance, guidelines 478 can include, but is not limited to UI guidelines, layout guidelines, animation guidelines, usability guidelines, and the like.

Repository 480 can be a hardware/software entity for can be an on-disk data structure which can store metadata for a set of files and/or directory structure. Repository 480 can persist project 482, repository 480 settings, and the like. In one instance, project 482 can include, but is not limited to, project code 484, support files, and the like. Project code 484 can include, but is not limited to, compiled language source files, interpreted source code files, markup files, and the like. For example, code 484 can be an Objective C, Swift, or, C# language source code file. Support files can include, but is not limited to, build files (e.g., Gradle scripts), metadata files (e.g., manifest.xml, Storyboard), resource files (e.g., strings, bitmap images), and the like.

Network 490 can be an electrical and/or computer network connecting one or more system 400 components. Network 490 can include, but is not limited to, twisted pair cabling, optical fiber, coaxial cable, and the like. Network 490 can include any combination of wired and/or wireless components. Network 490 topologies can include, but is not limited to, bus, star, mesh, and the like. Network 490 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that one or more components within system 400 can be optional components permitting that the disclosure functionality be retained. It should be understood that engine 420 components can be optional components providing that functionality is maintained. It should be appreciated that one or more components of engine 420 can be combined and/or separated based on functionality, usage, and the like. System 400 can conform to a Service Oriented Architecture (SOA), Representational State Transfer (REST) architecture, and the like.

Cloud computing can be a technology which can provide on-demand cloud computing platforms on a paid subscription basis. Cloud computing can include virtual cluster of computers, continually available, through the Internet. Cloud computing can include, but is not limited to, virtual machines, virtual private clouds (e.g., protected networks), virtual public clouds, virtual routers, virtual computing hardware, and the like. Virtual machines can include central processing units (CPU), graphical processing unit (GPU) for processing, Random Access Memory, console I/O (keyboard, display, mouse), storage, an operating system, application software (e.g., Web servers, databases, CRM, etc), and the like.

It should be appreciated that cloud computing can include AMAZON WEB SERVICES (AWS) and/or AWS related services/functionality. As used herein, AWS Lambda can be an event-driven, serverless computing platform provided by AMAZON as a part of the AMAZON WEB SERVICES. LAMBDA can be a compute service that runs code in response to events and automatically manages the compute resources required by that code.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for cross platform on demand user interfaces comprising:
   abstracting at least one characteristic of a user interface (UI) associated with an application source code into a view-controller object that conforms to an environment independent format, wherein the at least one characteristic is a layout characteristic and a control element characteristic;
   embedding, within an executable created from the source code, a placeholder functionality for presenting the user interface, wherein the placeholder functionality lacks the at least one characteristic, wherein the executable is a target native runtime environment specific executable comprising of programming instructions conforming to a programming language of the native runtime environment;
   converting the view-controller object to a language specific user interface object conforming to the programming language;
   during runtime of the executable, by the placeholder functionality, rendering the user interface using the UI object;
   deploying the executable lacking the user interface within a digital marketplace, wherein the marketplace provides access to the executable to a group of users authorized to use the marketplace;
   during runtime of the executable, by the executable, receiving the user interface object and rendering the user interface; and
   during runtime, by the executable, ignoring a user interface programming instruction embedded within the executable and rendering a different user interface from the UI object, wherein the UI object is cached within a data store of a server communicatively linked to a software development tool.

2. The method of claim 1, wherein the layout characteristic is at least one of a layout type.

3. The method of claim 1, wherein the control element characteristic is an aesthetic property comprising of at least one of a position, a size, and a color, and a shape.

4. The method of claim 1, wherein the view-controller object is at least one of a serialized object and a compiled class file.

5. The method of claim 1, further comprising:
   during runtime, performing reflection on the UI object to invoke at least one method to render the user interface.

6. The method of claim 1, further comprising:
   computing a delta between a UI object stored within a cache and a different UI object stored within a different cache.

7. The method of claim 6, further comprising:
   during runtime, the executable receiving the delta within the target native runtime environment.

8. The method of claim 6, further comprising:
   during runtime, the executable adjusting the user interface based on the delta.

9. The method of claim 1, wherein the converting is performed by a Web-based service with at least two parameters comprising of a target native runtime environment and a programming language.

10. A system for cross platform on demand user interfaces comprising:
    a memory;
    a streaming engine configured to create a wrapper library for a user interface of an application source code, permitting the source code to address the user interface via the wrapper library, wherein the engine is configured to create an executable of a target native runtime environment conforming to a programming language of the runtime environment and the engine is configured to determine a delta between the UI object and a different UI object, wherein the executable lacks sufficient programming instructions to render the user interface during execution, wherein the sufficient programming instructions comprise of a layout instruction and a plurality of control element instructions; and
    a data store configured to remotely persist the wrapper library, the source code, and the user interface;
    a caching component configured to generate UI object conforming to the target native runtime environment specific and the programming language; and
    a UI streamer configured to convey the UI object to the executable during runtime, the UI streamer, during runtime of the executable, configured to dynamically convey the delta between the UI object and a different UI object to the executable, wherein the UI object comprises of a layout data, a control element data, and a user interface metadata.

11. The system of claim 10, wherein the UI object is at least one of a serialized JAVA object, a serialized Javascript Object Notation (JSON) object, and a compiled class file.

12. A computer program product comprising a non-transitory computer readable storage medium having computer usable program code embodied therewith, the computer usable program code comprising:
    computer usable program code stored in a storage medium, if said computer usable program code is executed by a processor it is operable to graphically design a user interface (UI) archetype associated with a software development project of an integrated development environment (IDE), wherein the archetype comprises of at least one of a layout and a control element of a user interface using at least one of a data structure and a coding construct of a first programming language, wherein the project comprises of at least one of a source code file conforming to a second programming language and a support file;
    computer usable program code stored in a storage medium, if said computer usable program code is executed by a processor it is operable to generate an environment independent view-controller object from the archetype, wherein the view-controller object comprises of at least one of project hierarchy information and environment independent instructions for drawing the user interface archetype;
    computer usable program code stored in a storage medium, if said computer usable program code is executed by a processor it is operable to compile the source code into an executable lacking sufficient drawing instructions to draw the user interface within the target native runtime environment during runtime, wherein the executable comprises of a reference to the object identifier and at least one reference to an instruction identifier;
    computer usable program code stored in a storage medium, if said computer usable program code is executed by a processor it is operable to store within a computer readable storage medium the UI object for retrieval during runtime execution of the executable;

computer usable program code stored in a storage medium, if said computer usable program code is executed by a processor it is operable to receive and process the stored UI object during runtime execution of the executable within the target native runtime environment;

computer usable program code stored in a storage medium, if said computer usable program code is executed by a processor it is operable to draw the user interface within the target native runtime environment using the drawing instructions of the UI object, responsive to the processing;

computer usable program code stored in a storage medium, if said computer usable program code is executed by a processor it is operable to deploy the executable lacking the user interface within a digital marketplace, wherein the marketplace provides access to the executable to a group of users authorized to use the marketplace;

computer usable program code stored in a storage medium, if said computer usable program code is executed by a processor it is operable to, during runtime of the executable, receive the user interface object by the executable and rendering the user interface; and computer usable program code stored in a storage medium, if said computer usable program code is executed by a processor it is operable to, during runtime of the executable, ignore a user interface programming instruction embedded within the executable and rendering a different user interface from the UI object by the executable.

* * * * *